(12) United States Patent
Appel et al.

(10) Patent No.: US 10,674,737 B2
(45) Date of Patent: Jun. 9, 2020

(54) SYSTEM AND METHOD FOR PREPARING MEAT PRODUCTS

(71) Applicant: Perky Jerky LLC, Greenwood Village, CO (US)

(72) Inventors: Chris L. Appel, Longmont, CO (US); James Scott Donnel, Fort Collins, CO (US); Brian E. Levin, Englewood, CO (US); David A. Sosnick, Roseville, CA (US)

(73) Assignee: Perky Jerky, LLC, Greenwood Village, CO (US)

( * ) Notice: Subject to any disclaimer, the term of this patent is extended or adjusted under 35 U.S.C. 154(b) by 0 days.

(21) Appl. No.: 15/727,330

(22) Filed: Oct. 6, 2017

(65) Prior Publication Data
US 2018/0153181 A1 Jun. 7, 2018

Related U.S. Application Data

(60) Provisional application No. 62/405,459, filed on Oct. 7, 2016.

(51) Int. Cl.
*A22C 17/00* (2006.01)
*A22C 15/00* (2006.01)
*A23L 13/70* (2016.01)
*A23B 4/26* (2006.01)
*A23L 5/10* (2016.01)
*A23B 4/03* (2006.01)

(52) U.S. Cl.
CPC ........ *A22C 17/0093* (2013.01); *A22C 15/008* (2013.01); *A23B 4/26* (2013.01); *A23L 5/10* (2016.08); *A23L 13/70* (2016.08); *A22C 15/007* (2013.01); *A23B 4/031* (2013.01)

(58) Field of Classification Search
CPC . A23K 40/20; A23L 5/10; A23L 13/70; A23L 34/031; A23L 34/26; A22C 17/0093; A22C 15/008; A22C 15/007; A23B 4/031
USPC .................................................. 99/276, 482
See application file for complete search history.

(56) References Cited

U.S. PATENT DOCUMENTS

| 3,543,671 | A | * | 12/1970 | Rees | ........................ | A47J 27/18 |
| | | | | | | 99/333 |
| 3,701,263 | A | * | 10/1972 | Barrett | ..................... | F25D 9/005 |
| | | | | | | 198/465.1 |
| 3,750,560 | A | * | 8/1973 | Holmes | ................ | A47J 37/1223 |
| | | | | | | 210/DIG. 8 |
| 4,012,808 | A | * | 3/1977 | Strong | .................... | A23B 4/021 |
| | | | | | | 426/442 |

(Continued)

FOREIGN PATENT DOCUMENTS

CA       2031282        2/1992

OTHER PUBLICATIONS

U.S. Appl. No. 16/036,444, filed Jul. 16, 2018, Donnel.

(Continued)

*Primary Examiner* — Eric S Stapleton
(74) *Attorney, Agent, or Firm* — Sheridan Ross PC (57) ABSTRACT

A method and system for preparing meat products is provided. In various embodiments, methods and systems for preparing and producing jerky are provided. Embodiments of the present disclosure comprise structure for efficiently distributing, moving, marinating and preparing meat products including jerky. Enhanced efficiencies and improved safety measures are provided.

11 Claims, 8 Drawing Sheets

(56) References Cited

U.S. PATENT DOCUMENTS

| | | | | |
|---|---|---|---|---|
| 4,053,280 A * | 10/1977 | Salisbury | A61L 2/26 | 206/363 |
| 4,229,136 A * | 10/1980 | Panissidi | B25J 19/0012 | 414/673 |
| 4,260,319 A * | 4/1981 | Motoda | B25J 9/009 | 414/589 |
| 4,265,766 A * | 5/1981 | Crossley | A47J 36/20 | 210/455 |
| 4,503,502 A * | 3/1985 | Chapin | A47J 27/62 | 700/90 |
| 4,561,346 A * | 12/1985 | Marquer | A47J 27/14 | 219/433 |
| 4,574,776 A * | 3/1986 | Hidle | A47J 27/04 | 126/369 |
| 4,588,349 A * | 5/1986 | Reuter | B65G 1/1378 | 414/411 |
| 4,604,989 A * | 8/1986 | Kita | A47J 36/20 | 126/369 |
| 4,700,617 A * | 10/1987 | Lee | A47J 27/14 | 134/115 R |
| 4,818,550 A * | 4/1989 | Davidson | A23B 4/021 | 426/281 |
| 4,857,347 A * | 8/1989 | Webb | A23B 7/02 | 426/438 |
| 4,862,602 A | 9/1989 | Krill | | |
| 4,862,802 A * | 9/1989 | Streifer | F42B 3/113 | 102/201 |
| 4,917,912 A * | 4/1990 | Duncan | A23P 20/12 | 426/291 |
| 4,919,950 A * | 4/1990 | Mak | A47J 27/14 | 426/233 |
| 4,922,435 A * | 5/1990 | Cahlander | A47J 27/14 | 700/207 |
| 4,940,590 A * | 7/1990 | Williams | A23B 4/10 | 426/92 |
| 4,973,492 A * | 11/1990 | Gibson | A23L 13/428 | 426/513 |
| 5,012,726 A * | 5/1991 | Fehr | A21C 9/063 | 99/450.6 |
| 5,057,332 A * | 10/1991 | Davidson | A23B 4/021 | 426/281 |
| 5,088,390 A * | 2/1992 | Wong | A47J 43/04 | 99/327 |
| 5,172,328 A * | 12/1992 | Cahlander | A47J 27/14 | 700/112 |
| 5,174,195 A * | 12/1992 | Anderson | A22C 17/006 | 206/493 |
| 5,205,206 A * | 4/1993 | Kitama | A21C 11/16 | 99/326 |
| 5,249,914 A * | 10/1993 | Cahlander | A47J 27/14 | 414/793.4 |
| 5,262,185 A * | 11/1993 | Babka | A23P 20/12 | 426/291 |
| 5,266,064 A * | 11/1993 | Gagliardi, Jr. | A23L 13/55 | 452/135 |
| 5,281,426 A * | 1/1994 | Pardo | A23L 3/10 | 426/232 |
| 5,314,705 A * | 5/1994 | Hansson | A23B 4/068 | 426/393 |
| 5,363,751 A * | 11/1994 | Prestigiacomo | A47J 37/0704 | 99/425 |
| 5,385,085 A * | 1/1995 | Piane, Sr. | A47J 37/01 | 126/373.1 |
| D355,564 S * | 2/1995 | Dornbush | D7/350.3 | |
| 5,386,762 A * | 2/1995 | Gokey | A47J 27/14 | 414/225.01 |
| 5,403,600 A * | 4/1995 | Reutimann | B65B 25/067 | 426/302 |
| 5,415,883 A * | 5/1995 | Leu | A23L 13/03 | 426/293 |
| 5,421,246 A * | 6/1995 | Tippmann | A23G 7/02 | 165/918 |
| 5,429,831 A * | 7/1995 | Williams | A23B 4/10 | 426/92 |
| 5,431,937 A * | 7/1995 | Kandl | A23P 20/11 | 426/281 |
| 5,437,108 A * | 8/1995 | Alseth | A23L 3/40 | 34/196 |
| 5,484,625 A * | 1/1996 | Giles, Sr. | A23L 13/67 | 426/646 |
| 5,498,432 A * | 3/1996 | Leu | A23L 13/03 | 426/293 |
| 5,741,536 A * | 4/1998 | Mauer | A23B 4/0056 | 426/281 |
| 5,775,209 A * | 7/1998 | Tiemann | F24C 15/16 | 211/181.1 |
| 5,833,097 A * | 11/1998 | Ruth | G01F 11/00 | 222/368 |
| 5,846,594 A * | 12/1998 | Zimmerman | A23B 4/0056 | 426/643 |
| 5,934,178 A * | 8/1999 | Caridis | A21B 1/245 | 126/21 A |
| 5,972,398 A * | 10/1999 | Ludwig | A22C 9/00 | 426/281 |
| 5,996,820 A | 12/1999 | Broadnax | | |
| 5,998,820 A * | 12/1999 | Chi | H01L 27/108 | 257/296 |
| 6,007,418 A * | 12/1999 | Suhner | A23B 4/26 | 366/131 |
| 6,042,871 A * | 3/2000 | Cohen | A23L 13/428 | 426/518 |
| 6,051,264 A * | 4/2000 | Afman | A23B 4/00 | 426/243 |
| 6,105,490 A * | 8/2000 | Horn | A23B 4/26 | 366/139 |
| 6,112,645 A * | 9/2000 | Chang | A47J 37/1228 | 99/327 |
| 6,113,959 A * | 9/2000 | Ludwig | A23B 4/00 | 426/281 |
| 6,146,678 A * | 11/2000 | Caridis | A21B 1/245 | 426/510 |
| 6,242,025 B1 * | 6/2001 | Lesky | A47J 27/0802 | 426/231 |
| 6,279,328 B1 * | 8/2001 | Leeds | A23B 4/09 | 62/346 |
| 6,310,325 B1 * | 10/2001 | Colburn | A47J 27/0817 | 219/401 |
| 6,365,210 B1 * | 4/2002 | Schaible, II | A21C 11/006 | 426/275 |
| 6,405,645 B1 * | 6/2002 | Green | A23B 4/26 | 99/331 |
| 6,428,838 B1 * | 8/2002 | Gagliardi, Jr. | A22C 21/0076 | 426/518 |
| 6,431,628 B1 * | 8/2002 | Bell, Jr. | B60P 3/0257 | 296/22 |
| 6,451,364 B1 * | 9/2002 | Ito | A23L 3/26 | 426/244 |
| 6,515,262 B1 * | 2/2003 | Li | A47J 27/004 | 219/429 |
| 6,601,499 B1 * | 8/2003 | Bifulco | A22C 9/004 | 100/152 |
| 6,647,864 B1 * | 11/2003 | Fang | A47J 27/14 | 99/327 |
| 6,803,065 B1 * | 10/2004 | Miyamori | A23B 4/056 | 426/235 |
| 6,843,166 B1 * | 1/2005 | Li | A47J 27/14 | 99/327 |
| 7,159,510 B2 * | 1/2007 | LaMaster | A23B 4/031 | 99/349 |
| 7,174,830 B1 * | 2/2007 | Dong | B25J 9/0084 | 901/1 |
| 7,205,016 B2 * | 4/2007 | Garwood | A23B 4/10 | 426/108 |
| 7,381,438 B2 * | 6/2008 | Anders | A22C 7/0023 | 426/281 |
| 7,461,589 B2 * | 12/2008 | Sinton | A47J 27/004 | 219/428 |

(56) References Cited

U.S. PATENT DOCUMENTS

| | | | | |
|---|---|---|---|---|
| 7,670,042 B2* | 3/2010 | Cheung | ............... | B01F 9/0016 366/139 |
| 7,776,374 B2* | 8/2010 | Nielsen | ............... | A23B 4/00 426/281 |
| 7,824,721 B2* | 11/2010 | Sus | ............... | B65B 43/305 426/232 |
| 7,930,973 B2* | 4/2011 | Wong | ............... | A47J 37/108 366/144 |
| 8,047,902 B2* | 11/2011 | Van Esbroeck | ............... | A22C 9/005 452/141 |
| 8,140,188 B2* | 3/2012 | Takemitsu | ............... | B25J 9/1661 700/211 |
| 8,276,505 B2* | 10/2012 | Buehler | ............... | A23L 5/10 99/326 |
| 8,276,506 B2* | 10/2012 | Tojo | ............... | B25J 9/0003 99/325 |
| 8,293,298 B2* | 10/2012 | Van Esbroeck | ............... | A22C 9/001 426/281 |
| 8,334,004 B2* | 12/2012 | Liu | ............... | A23L 5/11 426/233 |
| 8,353,743 B1* | 1/2013 | Benson | ............... | A22C 11/029 452/45 |
| 8,376,815 B1* | 2/2013 | Parker | ............... | A22C 9/002 452/141 |
| 8,944,261 B1* | 2/2015 | Boonpakom | ............... | A23B 4/031 211/126.15 |
| 9,131,807 B2* | 9/2015 | Roy | ............... | A47J 44/00 |
| 9,445,614 B2* | 9/2016 | Storek | ............... | A47J 36/32 |
| 9,538,880 B2* | 1/2017 | Riefenstein | ............... | F24C 7/085 |
| 9,643,324 B1* | 5/2017 | Roy | ............... | B25J 5/04 |
| 9,775,466 B2* | 10/2017 | Zhang | ............... | A47J 37/1242 |
| 9,815,191 B2* | 11/2017 | Oleynik | ............... | G05B 19/42 |
| 9,895,018 B2* | 2/2018 | Lin | ............... | A47F 10/06 |
| 10,130,218 B2* | 11/2018 | Xu | ............... | A47J 36/34 |
| 10,139,423 B2* | 11/2018 | Brisebat | ............... | G01N 35/0099 |
| 10,140,587 B2* | 11/2018 | Garden | ............... | G06Q 50/12 |
| 2002/0006457 A1* | 1/2002 | Ludwig | ............... | A23B 4/20 426/281 |
| 2002/0012726 A1* | 1/2002 | Anders | ............... | A22C 7/0023 426/281 |
| 2002/0090431 A1* | 7/2002 | Weldy | ............... | A23L 13/50 426/332 |
| 2002/0185084 A1* | 12/2002 | Sherrill | ............... | A01K 15/026 119/710 |
| 2002/0185085 A1* | 12/2002 | Sherrill | ............... | A01K 15/026 119/710 |
| 2003/0008043 A1* | 1/2003 | Crider | ............... | A23L 13/422 426/281 |
| 2003/0039735 A1* | 2/2003 | Morii | ............... | A23P 20/12 426/559 |
| 2003/0065414 A1* | 4/2003 | van den Nieuwelaar | ............... | A22B 3/005 700/97 |
| 2003/0165602 A1* | 9/2003 | Garwood | ............... | A23B 4/16 426/392 |
| 2003/0170357 A1* | 9/2003 | Garwood | ............... | A23B 4/16 426/392 |
| 2003/0179653 A1* | 9/2003 | McLemore | ............... | A47J 36/32 368/10 |
| 2003/0197367 A1* | 10/2003 | Meischen | ............... | G09F 3/02 283/81 |
| 2004/0011223 A1* | 1/2004 | Odom, Jr. | ............... | A23P 10/10 99/494 |
| 2004/0086368 A1* | 5/2004 | Downs | ............... | B25J 15/0253 414/741 |
| 2004/0097180 A1* | 5/2004 | Long | ............... | A22C 9/00 452/141 |
| 2004/0126513 A1* | 7/2004 | Bekele | ............... | B65D 81/264 428/34.1 |
| 2004/0159244 A1* | 8/2004 | Leason | ............... | A47J 36/165 99/348 |
| 2004/0173103 A1* | 9/2004 | Won | ............... | A47J 27/62 99/326 |
| 2005/0011370 A1* | 1/2005 | Xu | ............... | A47J 36/165 99/409 |
| 2005/0031749 A1* | 2/2005 | Church | ............... | A23L 13/03 426/512 |
| 2005/0037129 A1* | 2/2005 | Newkirk | ............... | A23L 13/03 426/646 |
| 2005/0160920 A1* | 7/2005 | Guess | ............... | A47J 27/62 99/419 |
| 2005/0163912 A1* | 7/2005 | White | ............... | A23B 4/03 426/641 |
| 2005/0193901 A1* | 9/2005 | Buehler | ............... | A47J 44/00 99/468 |
| 2005/0223906 A1* | 10/2005 | Xu | ............... | A47J 27/004 99/348 |
| 2006/0013939 A1* | 1/2006 | Schopf | ............... | A23B 3/227 426/656 |
| 2006/0147588 A1* | 7/2006 | Garwood | ............... | A23B 4/16 426/392 |
| 2007/0031550 A1* | 2/2007 | Samson | ............... | B65B 25/067 426/392 |
| 2007/0031551 A1* | 2/2007 | Samson | ............... | B65B 25/067 426/392 |
| 2007/0042095 A1* | 2/2007 | Gagliardi, Jr. | ............... | A22C 17/0006 426/332 |
| 2007/0110882 A1* | 5/2007 | Pivik | ............... | A22C 7/003 426/641 |
| 2007/0184156 A2* | 8/2007 | Samson | ............... | B65B 25/067 426/392 |
| 2007/0292590 A1* | 12/2007 | Levin | ............... | A23L 13/42 426/629 |
| 2008/0105697 A1* | 5/2008 | Harris | ............... | B65D 81/22 220/735 |
| 2008/0110347 A1* | 5/2008 | Wong | ............... | A47J 36/165 99/348 |
| 2008/0181987 A1* | 7/2008 | Lusby | ............... | A23L 13/03 426/62 |
| 2008/0248162 A1* | 10/2008 | Cook | ............... | B65D 81/3294 426/61 |
| 2009/0029080 A1* | 1/2009 | Visioli | ............... | A22C 13/0013 428/34.8 |
| 2009/0029081 A1* | 1/2009 | Lee | ............... | B32B 27/08 428/34.9 |
| 2009/0183729 A1* | 7/2009 | Barkhouse | ............... | A47J 27/62 126/39 BA |
| 2009/0208624 A1* | 8/2009 | Mauer | ............... | A22C 7/0084 426/513 |
| 2009/0246333 A1* | 10/2009 | Groneberg-Nienstedt | ............... | A22C 7/003 426/295 |
| 2009/0297678 A1* | 12/2009 | Liu | ............... | A47J 43/04 426/438 |
| 2009/0324790 A1* | 12/2009 | Hilgren | ............... | A22B 7/008 426/335 |
| 2010/0010902 A1* | 1/2010 | Casey | ............... | G06Q 10/08 705/17 |
| 2010/0047400 A1* | 2/2010 | Carlson | ............... | A23P 20/18 426/92 |
| 2010/0074998 A1* | 3/2010 | Espeleta Vega | ............... | A23J 3/14 426/92 |
| 2010/0080880 A1* | 4/2010 | Backes | ............... | A23G 4/06 426/534 |
| 2011/0011278 A1* | 1/2011 | Jones | ............... | A47J 37/1219 99/406 |
| 2011/0200685 A1* | 8/2011 | Harvey | ............... | A01N 59/00 424/661 |
| 2011/0200688 A1* | 8/2011 | Harvey | ............... | A01N 59/00 424/723 |
| 2011/0277420 A1* | 11/2011 | Peters | ............... | B65B 7/164 53/266.1 |
| 2012/0011862 A1* | 1/2012 | Muscato | ............... | A23B 4/09 62/62 |
| 2012/0015074 A1* | 1/2012 | Draganski | ............... | A23B 4/03 426/59 |

(56) References Cited

U.S. PATENT DOCUMENTS

| | | | |
|---|---|---|---|
| 2012/0219676 A1* | 8/2012 | Juravic | B26D 1/147 426/321 |
| 2012/0237648 A1* | 9/2012 | Ortiz | A22C 17/0026 426/250 |
| 2012/0244262 A1* | 9/2012 | Mauer | A22C 7/0084 426/246 |
| 2012/0251700 A1* | 10/2012 | Hofing | A23B 4/023 426/542 |
| 2012/0288613 A1* | 11/2012 | Mauer | A22C 7/0084 426/644 |
| 2013/0071544 A1* | 3/2013 | Alexander | A23L 3/36 426/615 |
| 2013/0280388 A1* | 10/2013 | Ekanayake | A23L 3/01 426/241 |
| 2013/0288584 A1* | 10/2013 | Connor | A22C 17/0006 452/171 |
| 2014/0311356 A1* | 10/2014 | Daniels | A47J 37/0713 99/340 |
| 2014/0363547 A1* | 12/2014 | Torrens-Figueroa | A22C 17/004 426/231 |
| 2015/0013550 A1* | 1/2015 | Lin | A47F 10/06 99/404 |
| 2015/0114236 A1* | 4/2015 | Roy | A47J 44/00 426/231 |
| 2015/0190538 A1* | 7/2015 | Olvera | A61L 2/22 422/107 |
| 2015/0216204 A1* | 8/2015 | Juravic | B26D 7/18 426/657 |
| 2015/0296835 A1* | 10/2015 | Anderson | A23J 3/14 426/106 |
| 2015/0342204 A1* | 12/2015 | Deumier | A23L 3/40 34/412 |
| 2016/0037788 A1* | 2/2016 | Corbin | A22C 17/0033 426/645 |
| 2016/0066602 A1* | 3/2016 | Smith | A22C 17/04 426/243 |
| 2016/0213011 A1* | 7/2016 | Howard | A22C 17/0006 |
| 2016/0338361 A1* | 11/2016 | Smittle | A01N 63/02 |
| 2016/0338392 A1* | 11/2016 | Gillette | A23L 3/3589 |
| 2017/0027202 A1* | 2/2017 | Timberlake | A23B 4/0056 |
| 2017/0042166 A1* | 2/2017 | Ludwig | A22C 9/004 |
| 2018/0077956 A1* | 3/2018 | Harkema | A23L 13/428 |

OTHER PUBLICATIONS

"Chicken jerky: a recipe," Yankee Kitchen Ninja, Oct. 18, 2011, pp. 1-3, 17 pages [retrieved online Nov. 16, 2017 from: web.archive.org/web/20150907060658/https://www.consolidatedfoodservice.com/pitco-p6073128].

"Pitco P6073128 Rack," Consolidated Foodservice, 2015, 1 page [retrieved online Nov. 16, 2017 from: web.archilve.org/web/20150907060658/https://www.consolidatedfoodservice.com/pitco-p6073128].

International Search Report and Written Opinion for International (PCT) Patent Application No. PCT/US17/55610, dated Dec. 11, 2017 7 pages.

International Preliminary Report on Patentability for International (PCT) Patent Application No. PCT/US17/055610, dated Apr. 18, 2019, 6 pages.

* cited by examiner

SYSTEM AND METHOD FOR PREPARING MEAT PRODUCTS

This U.S. Non-Provisional Patent Application claims the benefit of priority from U.S. Provisional Patent Application Ser. No. 62/405,459, filed Oct. 7, 2016, the entire disclosure of which is hereby incorporated by reference in its entirety.

FIELD

The present disclosure relates generally to methods and systems for preparing food. More specifically, embodiments of the present disclosure relate to methods of handling, preparing and producing meat products. Certain embodiments of the present discourse relate to methods and systems for handling and preparing jerky. As used herein, the term "jerky" is not limited to any particular animal product. Jerky includes, but is not limited to, meat product formed from any one or more of bovine, fowl, porcine, caprine, poultry, and aquatic animals.

BACKGROUND

Existing methods of producing jerky products generally comprise marinating or seasoning thawed meat in a batch form where the meat product is loose. The product is marinated or seasoned for a desired amount of time and later transferred to a cooking or drying operation. Existing processes are labor intensive and inefficient.

SUMMARY

Accordingly, there has been a long-felt but unmet need to provide a method and system for handling, preparing and cooking jerky in a more efficient manner. There further exists a need to provide methods and systems that reduce the amount of handling required during jerky preparation, as well as a need to increase the safety of jerky-production operations with respect to both the manufacturers and consumers of the product.

In various embodiments, a method of preparing meat products for consumption is provided. In one embodiment, a method is provided wherein a seasoning, marinade or sauce is provided and placed within a tank, bin or receptacle. A meat product (e.g. turkey, beef, salmon, yak, etc.) is cut, carved or sliced to a desired thickness. In some embodiments, it is contemplated that the meat product is sliced while in a frozen or semi-frozen state. The sliced meat product is then placed onto one or more screens, and the meat product(s) are preferably spaced to minimize contact between adjacent meat product. The one or more screens are provided on a magazine that is operable to receive a plurality of screens. The magazine or frame comprising one or more screens is then transferred to the tank, bin or receptacle comprising the marinade. The magazine comprising screens and meat product is allowed to marinate for a period of time (e.g. 1-12 hours). After the period of time has elapsed, the screens are removed from the tanks and the meat is cooked and/or dried. In preferred embodiments, the racks comprising meat product are inserted into cooking racks or "trucks." The truck(s) are then moved to a cooking oven, dehydrator or smokehouse. In various embodiments, the meat product is cooked at specific temperature settings for a period of time (e.g. 1-2 hours) and/or until the meat product is provided at a specific temperature (e.g. 160 degrees F.). Once the desired cook time and/or temperature is achieved, the meat product is removed from the oven, smoker, or smokehouse and allowed to cool. After cooling, the meat product is packaged and ready for shipment, sale, consumption, etc.

In various embodiments, a system for preparing and producing meat product is provided. Systems of the present disclosure contemplate devices and features for handling, preparing and cooking meat. In certain embodiments, systems of the present disclosure comprise one or more of: a screen, a magazine, a lifting harness, a soaking tank, a magazine cart, a gantry, hoist, and hoist hook, a cooking truck, a trief slicer, and an oven, dehydrator or similar apparatus.

In various embodiments of the present disclosure, screens or racks are provided to support and handle meat products. Screens or racks of the present disclosure generally comprise metal racks with a grate member to support the weight of meat products and allow liquid marinade (for example) to pass through the rack and contact meat products. The racks are moveable and are operable to be stacked, provided within a lifting frame, and/or provided within an oven or similar device.

In various embodiments, systems and devices for supporting racks are contemplated. In some embodiments, a magazine, cage, or lifting frame is provided that is operable to receive, support and transport a plurality of racks. The lifting frame(s) of the present disclosure comprise a support structure as shown and described herein that is operable and arranged to support the weight of a plurality of racks and associated meat products. The lifting frame(s) preferably comprise an at least partially open construction wherein fluid (air, marinade, etc.) is allowed to flow through at least one side or portion of the lifting frame and expose meat products to the fluid. The lifting frame is operable to receive various forces, including tension forces applied during lifting and transportation of a plurality of stacked racks and associated meat products. As used herein, the terms "magazine", "cage", and "lifting frame" may be used interchangeably. In various embodiments, racks and lifting frames are provided such that the racks are stacked directly adjacent to one another in a manner that prevents meat products from being displaced or floating, particularly when submerged in a liquid marinade.

In various embodiments, an upper frame member is provided that comprises an upper portion of a lifting frame. The upper frame member is contemplated as being selectively securable to the lifting frame. The upper frame member preferably comprises a lift point such as a welded hook, eyelet or similar member to receive a lifting device. In some embodiments, the upper frame member is secured to the lifting frame by one or more pins.

In various embodiments, at least one soaking or marinating tank is provided. Tanks of the present disclosure are contemplated as comprising an internal volume to receive a liquid marinade, and wherein the internal volume is sized to receive at least one lifting frame. An assembled lifting frame, including associated racks and meat products may be placed within the internal volume to enable a marinating step. In preferred embodiments, the internal volume of the tank is only slightly larger than the external dimensions of the lifting frame to minimize an amount of liquid marinade required.

In various embodiments, a cart is provided that comprises wheels and a drip pan. Carts of the present disclosure are useful for and operable to prepare and assemble a plurality of stacked racks within a lifting frame. The lifting frame and carts are sized such that carts comprise a means for temporarily storing and transporting assembled or partially-assembled lifting frames.

In some embodiments, a gantry assembly, a hoist and a hoist hook are provided to lift and transport racks and lifting frames. In some embodiments, a gantry assembly comprises a built-in fixture of an existing building, such as an overhead beam. In other embodiments, the gantry comprises a portable, self-contained gantry. Hoists of the present disclosure are contemplated as comprising various known hoists including, but not limited to moveable hoists and winches with electric motors. The hoist may comprise a hook for selective communication with lifting frames.

In some embodiments, cooking trucks are provided that are operable to receive and support a plurality of racks. The cooking trucks are operable to be conveyed to the confines of an oven, dehydrator, or smoker to support the meat products during a cooking and/or drying operation. The cooking trucks are also operable for use during a cooling operation wherein meat products are allowed to cool prior to packaging.

In one embodiment, a system for handling and preparing jerky is providing. The system comprises a lifting frame comprising a plurality of horizontal supports and a plurality of vertical supports; an upper frame member that is selectively securable to the lifting frame, and wherein the upper frame member comprises at least one lifting member operable to receive and transmit force to the lifting frame. A plurality of racks is provided that are sized and operable to be received by the lifting frame, each of the plurality of racks comprising at least one of a mesh and a grate that is operable to support a meat product and to allow at least a portion of the meat product to be exposed to an external environment. A tank is provided that comprises an internal volume operable to receive a liquid. The internal volume of the tank is larger than a volume of the lifting frame. A lifting assembly is provided that comprises a motor and a connecting member to selectively communicate with the lifting member of the upper frame member.

In one embodiment, a system for handling and preparing jerky is provided that comprises a lifting frame comprising a plurality of horizontal supports and a plurality of vertical supports. An upper frame member is provided that is selectively securable to the lifting frame, and wherein the upper frame member comprises at least one lifting member operable to receive and transmit force to the lifting frame. A plurality of racks is provided that are sized and operable to be received by the lifting frame, and each of the plurality of racks comprising at least one of a mesh and a grate that is operable to support a meat product and to allow at least a portion of the meat product to be exposed to an external environment. A tank is provided that comprises an internal volume operable to receive a liquid. The internal volume of the tank is preferably larger than a volume of the lifting frame. A lifting assembly is provided that comprises a connecting member that is operable to selectively communicate with at least one of the lifting frame and the upper frame member.

In various embodiments, methods of producing meat products are provided. In one embodiment, a method of producing jerky is provided that comprises the steps of: providing a meat product; slicing the meat product into a plurality of meat segments; providing the meat segments on a plurality of racks; providing the racks in a stacked arrangement, wherein at least a portion of the stacked arrangement is in communication with a lifting frame; providing a tank with an internal volume, and providing a liquid marinade within the internal volume; positioning the lifting frame and each of the plurality of racks within the internal volume of the tank such that each of the plurality of meat segments are in contact with the liquid marinade; allowing the meat segments to rest in contact with the liquid marinade for a predetermined amount of time; removing the lifting frame from the internal volume of the tank by vertically displacing the lifting frame; and conveying the meat segments to at least one further processing step. It is contemplated that the at least one further processing step comprises at least one of cooking the meat segments, cooling the meat segments, seasoning the meat segments and packaging the meat segments. In some embodiments, methods of the present disclosure contemplate subject meat segments to an X-ray imaging process and contemplate evaluating X-ray images of the meat product(s) to determine whether not foreign bodies are present within the meat product(s).

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more readily apparent from the Detailed Description, particularly when taken together with the drawings.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of these inventions.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

Figure 1:
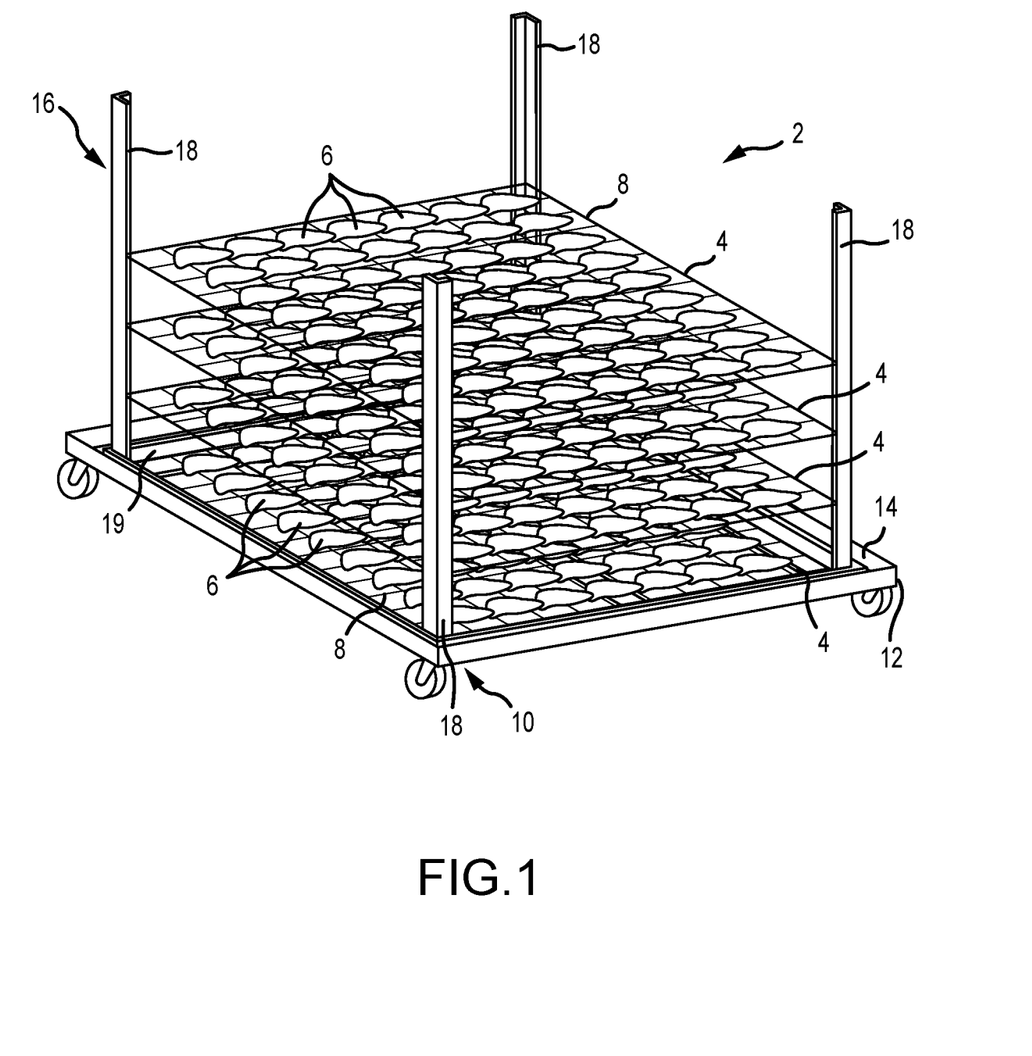
FIG. 1 is a perspective view of meat products in combination with components of a system for meat preparation according to one embodiment of the present disclosure.

FIG. 1 is a perspective view of a system 2 for preparing food. In various embodiments, the system 2 is contemplated for use with meat products and more specifically for the handling, preparation, cooking, and production of jerky. It will be recognized, however, that methods and systems are not limited to use with any particular meat or food product. Methods, devices and systems as described herein comprise novel features regardless of specific applications or methods of use.

As shown in FIG. 1, the system 2 comprises a plurality of racks 4. The racks 4 comprise metal grates or screens that are operable to support meat product(s). FIG. 1 depicts a plurality of sliced meat segments 6 distributed across a length and width of each rack 4. The racks 4 comprise bars 8 extending in at least one direction and preferably in two or more dimensions of the rack 4. The racks 4 are provided with meat segments 6 and are provided in a stacked arrangement as shown in FIG. 1. In preferred embodiments and methods of the present disclosure, racks 4 with at least partially-frozen meat products are stacked to provide a compressive force to each of the racks and thus prevent meat products from moving, particularly when immersed in a liquid marinade. The racks 4 also provide enough separation to enable marinade (for example) to contact meat product(s) provided on the racks 4.

A cart 10 is provided that comprises a wheel base 12 and removable tray 14. The tray 14 is provided as a removable component with respect to the wheel base 12. The tray 14 provides structural support to the system and serves to collect and catch drippings from the meat segments 6 and various components of the system.

A support structure is provided to receive and support the weight of a plurality of racks 4. In FIG. 1, a support structure in the form of a magazine or lifting frame 16 is provided. The lifting frame comprises a metal frame member with a plurality of vertical supports 18 and a plurality of horizontal supports 20. The vertical supports 18 preferably comprise an angled cross-section. In the embodiment of FIG. 1, the vertical supports 18 comprise a generally L-shaped cross-section that is operable to receive and contain a corner of a rack 4. As shown in FIG. 1, each of the plurality of vertical supports 18 is provided to receive and contain the corners of a plurality of racks 4. In various embodiments, a plurality of racks 4 with meat products provided thereon are stacked in the arrangement shown in FIG. 1. When stacking is complete, the lifting frame 16, racks 4 and associated meat segments 6 are ready for further processing in accordance with the present disclosure.

Although not shown in FIG. 1, an upper frame member is provided and secured to the upper portions of each of the vertical support members 18. The upper frame member comprises a lift point, as shown and described herein, and provides a means for lifting the assembled lifting frame 16 from the cart 10. The assembled lifting frame and associated racks may then be transported to additional locations and process steps.

Figure 2:
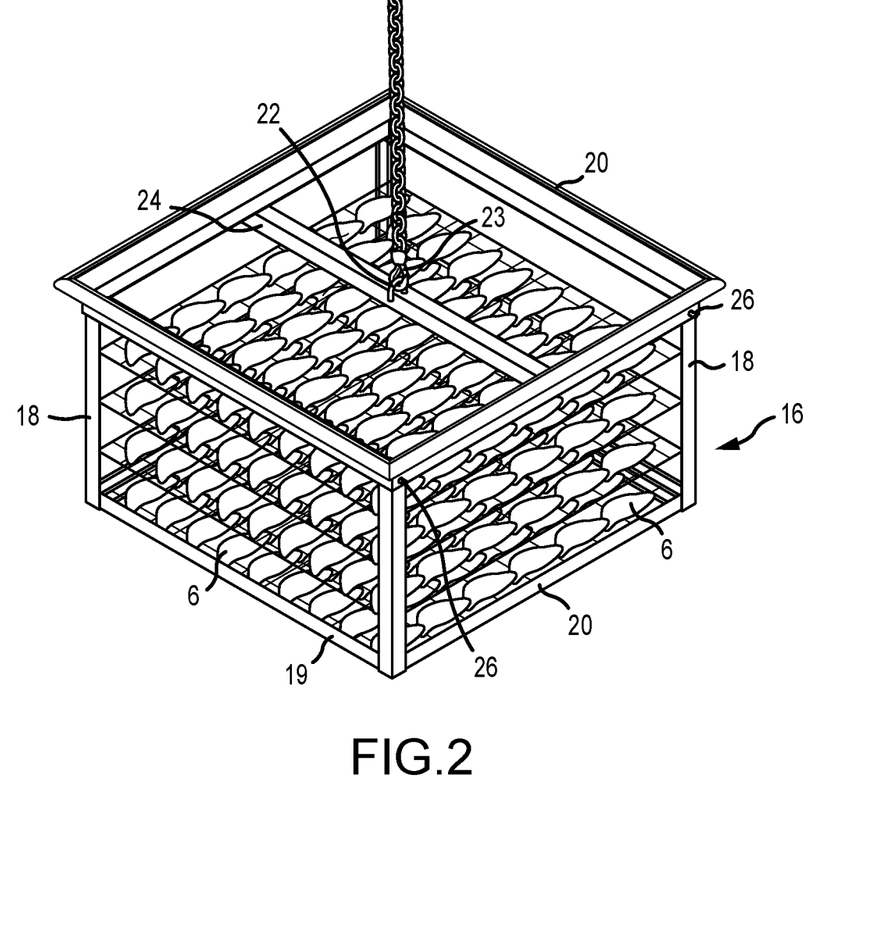
FIG. 2 is a perspective view of components of a system for meat preparation according to one embodiment of the present disclosure.

FIG. 2 is a perspective view of a lifting frame 16 provided with an upper frame member 20. The upper frame member 20 is secured to the magazine 16 and comprises a lift-point 22 where a hook 23 or similar lifting member may be attached to lift and/or transport the lifting frame 16. As shown in FIG. 2, the lifting frame 16 has been lifted from the cart of FIG. 1 and is suspended in a manner that enables transportation and relocation of the lifting frame 16, racks 4 and associated meat products 6. The lifting frame 16 as provided in FIG. 2 is operable to be transported to various locations and positions and is operable to be handled and processed in various ways. For example, the devices and arrangement of FIG. 2 are rendered operable to be inserted or lowered into further features of the present disclosure including, but not limited to, a tank for soaking or marinating the meat products.

The upper frame member 20 comprises a rectangular frame member with a center beam 24. The center beam 24 comprises a load-bearing member that is secured to a remainder of the upper frame member 20 and is operable to support the entire weight of the magazine including racks 4, associated meat product(s) 6 and related components. In the depicted embodiment, the upper frame member 20 comprises a plurality of pin connections 26 to selectively secure the upper frame member 20 to the lifting frame 16 at each of the four corners of the upper frame member 20. Although a single center beam 24 is shown in FIG. 2, other embodiments of the present disclosure contemplate the provision of a plurality of beams and structures to support the weight of a loaded magazine. For example, in some embodiments, it is contemplated that the center beam 24 comprises a truss member with greater load capacity than a simple beam. Various truss designs may be employed in such embodiments. It is also contemplated that the center beam 24 may comprise various cross-sections including an I-beam cross section. In some embodiments, a plurality of weight-supporting beams are provided. In one embodiment, a plurality of beams extend at angle from each of the four corners of an upper frame member such that the beams do not comprise horizontal beam members and the lifting force applied by a gantry hook (for example) is not normal to the longitudinal axis of the beam (as shown in the embodiment of FIG. 2, for example).

Figure 3A:
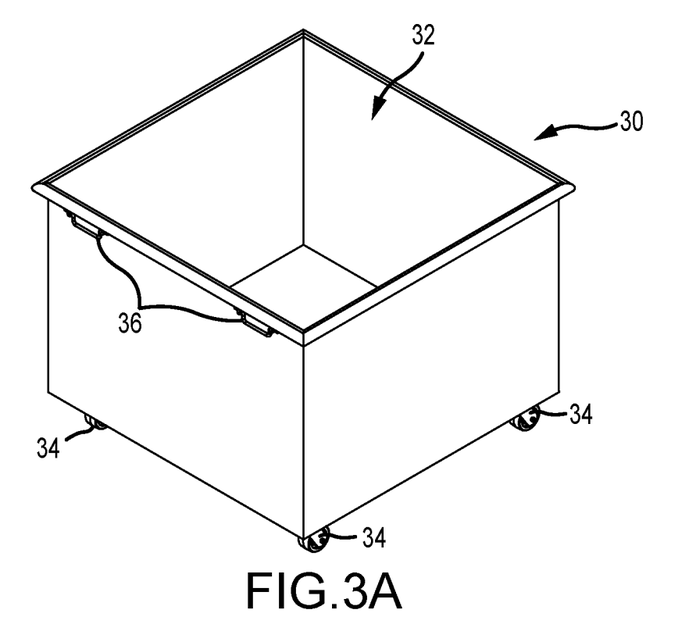
FIG. 3A is a perspective view of components of a system for meat preparation according to one embodiment of the present disclosure.
Figure 3B:
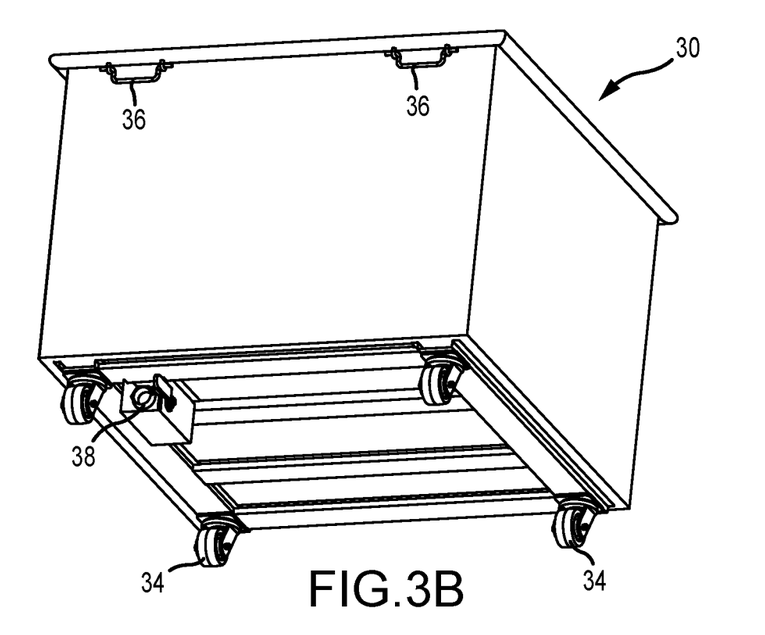
FIG. 3B is a perspective view of the components shown in FIG. 3A.

FIGS. 3A-3B are perspective views of a tank 30 according to one embodiment of the present disclosure. The tank 30 is operable for use as a soaking and marinating tank for meat products and comprises a component of a system for producing jerky. The tank 30 comprises a rectilinear cube, but it will be expressly recognized that tanks 30 of the present disclosure may comprise various different shapes. In preferred embodiments, however, it is contemplated that the tank 30 comprises dimensions that are slightly larger than the outer dimensions of an assembled lifting frame 16 to provide an efficient system and reduced wasted or unneeded marinade. The tank 30 preferably comprises a stainless steel tank with an internal volume 32 for receiving marinade and meat products. In the depicted embodiment, the tank 30 is provided with a plurality of wheels 34 and handles 36 to facilitate movement of the tank 30. At least one of the wheels 34 preferably comprises a lock or brake mechanism to selectively prevent movement of the tank 30.

A drain valve 38 is provided in communication with a lower portion of the tank 30 to selectively drain contents of the tank 30. In various embodiments, the drain valve comprises at least one of a manually-operated ball valve and a gate valve to empty contents such as used or spent marinade.

Figure 4:
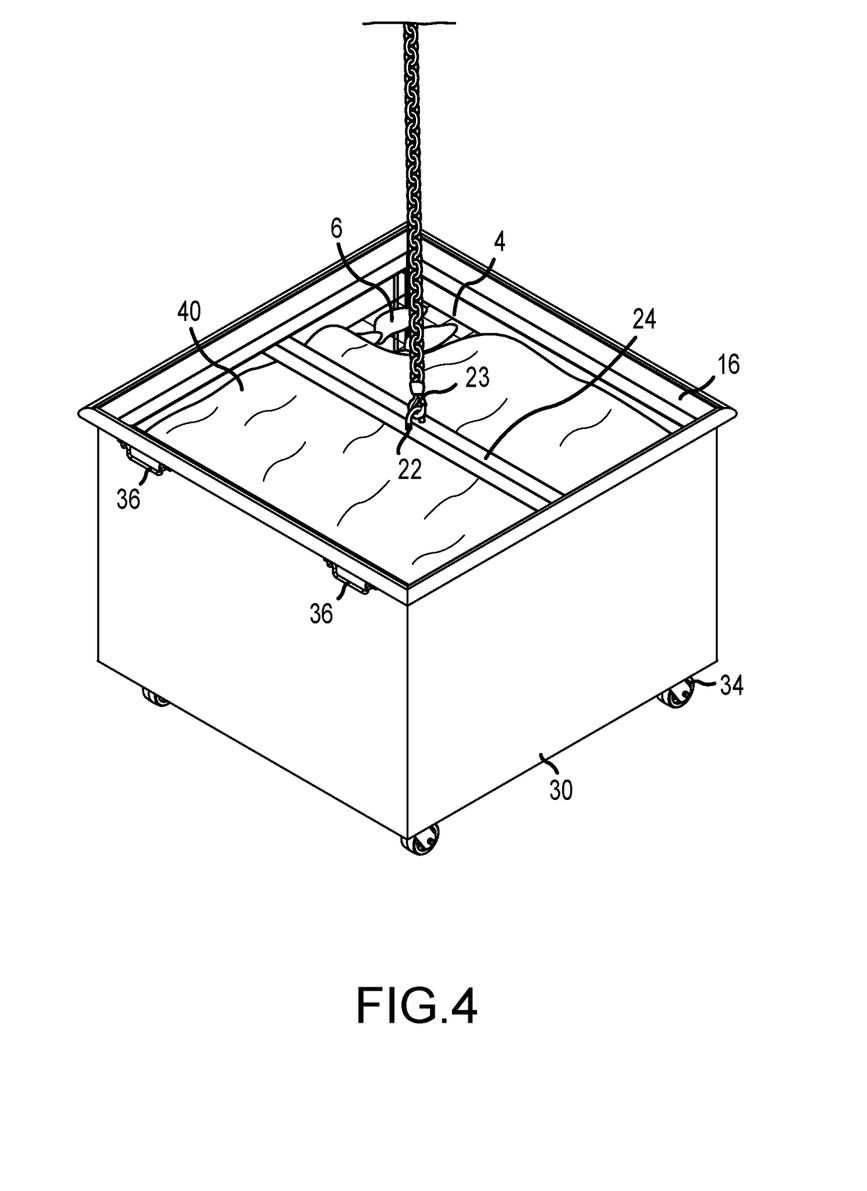
FIG. 4 is a perspective view of meat products in combination with components of a system for meat preparation according to one embodiment of the present disclosure.

FIG. 4 is a perspective view of a method step and system components of one embodiment of the present disclosure. As shown, a tank 30 is provided. The tank 30 comprises an internal volume for receiving and holding a liquid marinade 40. The internal volume 32 of the tank 30 is further operable to receive a magazine 16 and a plurality of racks associated with the magazine for holding meat products 6. In various embodiments of the present disclosure, methods of preparing jerky comprise the steps of providing an assembled magazine with a plurality of meat products 6 into a tank 30 that comprises marinade 40. The magazine is hoisted and lifted at a load or lift-point 22 and is moved in a vertical and/or horizontal direction to relocate the magazine from an initial position in which it is loaded (see FIG. 1, for example) into a tank 30. The magazine 16 and associated meat products 6 can rest or marinate for a desired period of time (e.g. 6 hours) wherein the meat is fully submersed in the marinade 40 during this period of time. After the desired period of time has elapsed, the magazine 16 and associated meat products are lifted or otherwise removed from the tank 30 and subjected to further process steps (e.g. cooking). In some embodiments, methods of the present disclosure contemplate emptying liquid marinade 40 from the tank 30 prior to lifting the magazine 16 from the tank 30 to reduce the load on lifting equipment. Emptying of the marinade is contemplated as being accomplished by the drain valve 38 provided in the tank 30.

Figure 5:
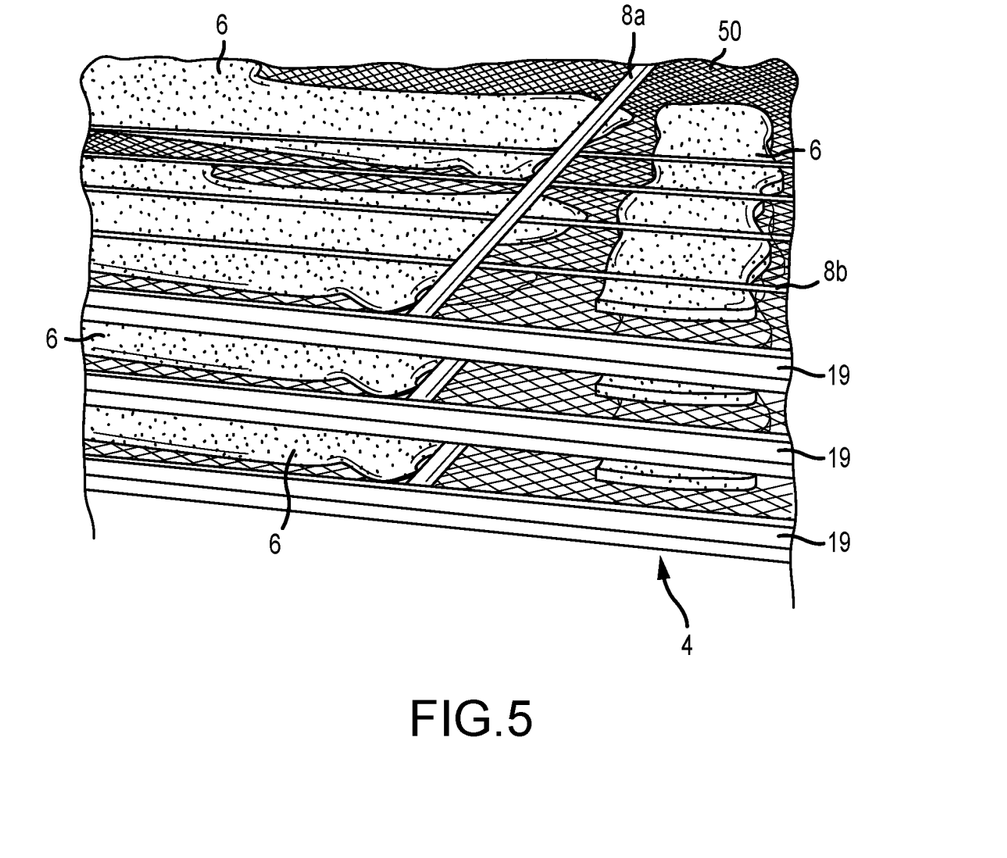
FIG. 5 is a perspective view of a plurality of racks provided with meat products according to one embodiment of the present disclosure.

FIG. 5 is a detailed perspective view of a lifting frame 16 after a marinating step. The magazine of FIG. 5 is provided with a plurality of racks 4 comprising mesh screens 50 or grates to support meat products 6 and to allow marinade (not shown in FIG. 5) to contact the surface of the meat. The racks 4 further comprise supports 8a, 8b that are provided substantially perpendicular to one another.

Figure 6:
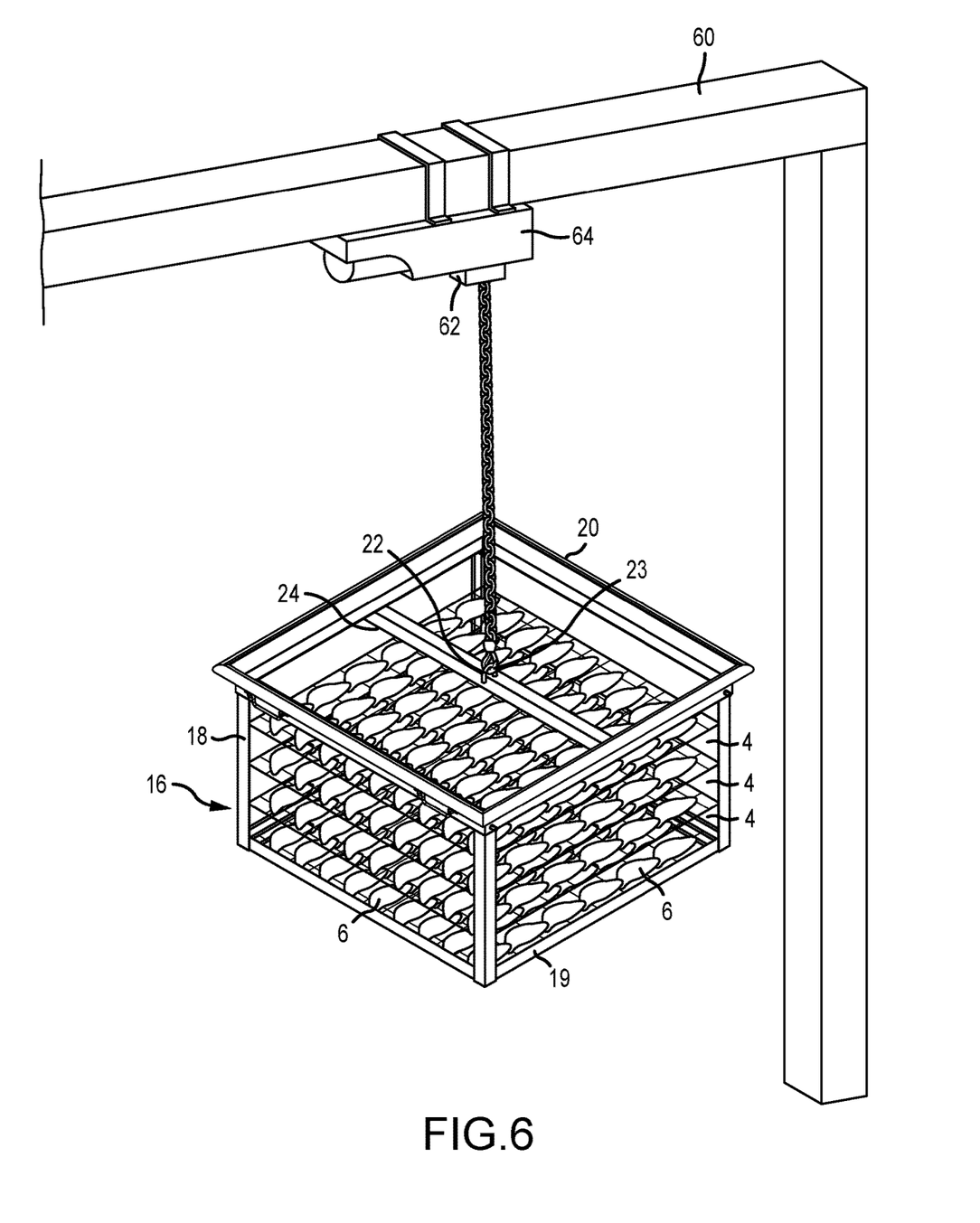
FIG. 6 is a perspective view of meat products in combination with components of a system for meat preparation according to one embodiment of the present disclosure.

FIG. 6 is a perspective view of a system for meat production according to one embodiment of the present disclosure. As shown, a lifting frame 16 is provided that comprises a plurality of racks 4 and wherein each of the plurality of racks 4 is provided with meat product(s). As will be recognized by one of ordinary skill in the art and as shown and described herein, the magazine as shown in FIG. 6 provides an efficient means of preparing and producing jerky. It will also be recognized that the loaded magazine 16 of FIG. 6 comprises a heavy object that cannot or should not be moved manually. Accordingly, embodiments of the present disclosure including that shown in FIG. 6 provide means and structure for lifting and moving meat production devices. A gantry structure 60 is provided as an overhead support structure to support a hoist 62 and/or hook 64. The gantry structure 60 may be provided as a moveable or portable gantry, or may be an integrated overhead support beam or structure in an existing building. The hoist 62 and motor provide a powered lifting means to lift and/or translate the lifting frame 16 before and/or after a marinating step.

Figure 7:
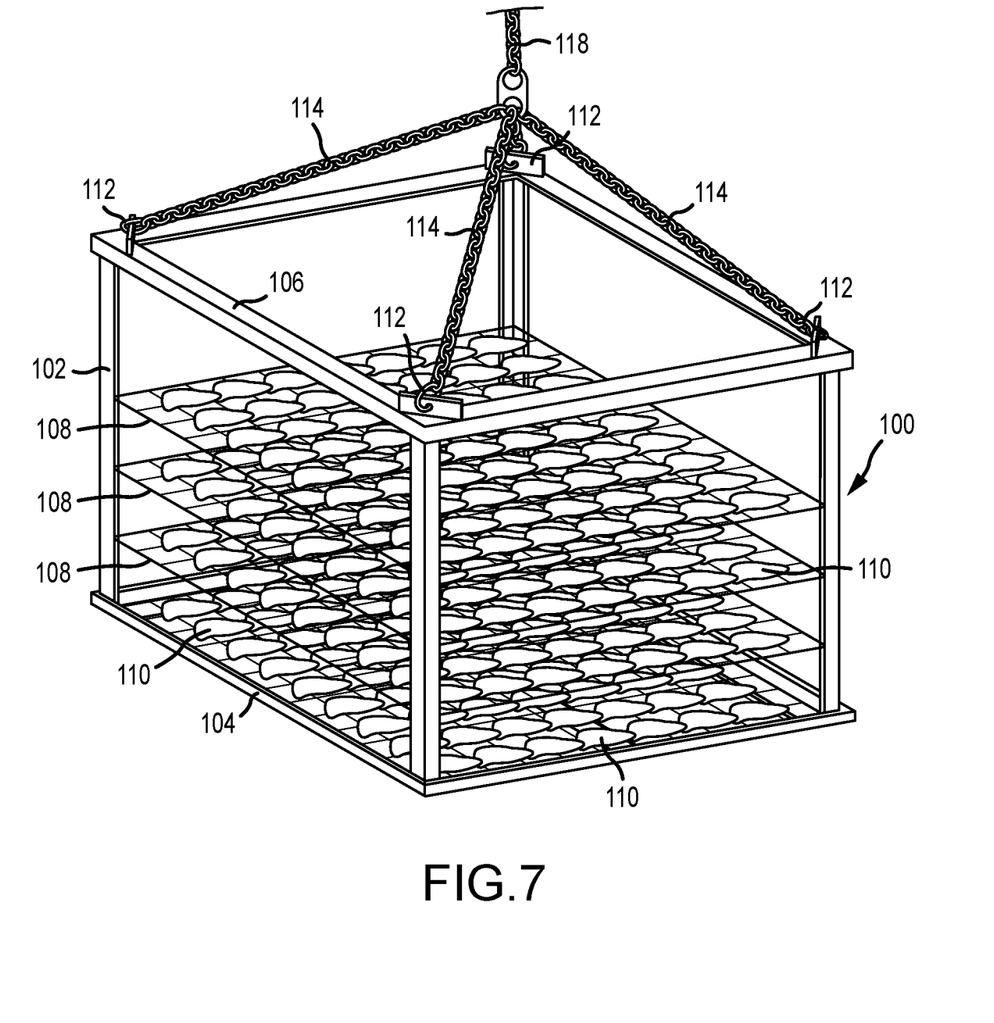
FIG. 7 is a perspective view of a lifting frame and associated components according to one embodiment of the present disclosure.

FIG. 7 is a perspective view of a lifting frame 100 according to an alternative embodiment of the present disclosure. As shown, the lifting frame 100 comprises a frame having vertical 102 and horizontal supports 104. The lifting frame 100 is operable to receive a plurality of racks 108 which are provided with sliced meat products 110. An upper frame member 106 is selectively secured to the lifting frame 100. The upper frame member 106 comprises a load point or lift point 112 in each of the four corners of the upper frame member 106. The lifting frame and associated racks may be lifted and/or moved by hoisting the lifting frame from each of the lift points 112. A chain or similar tension member 114 is secured to each of the lift points and, as shown in FIG. 7, each of the chains are connected to a primary lifting chain 118.

Figure 8:
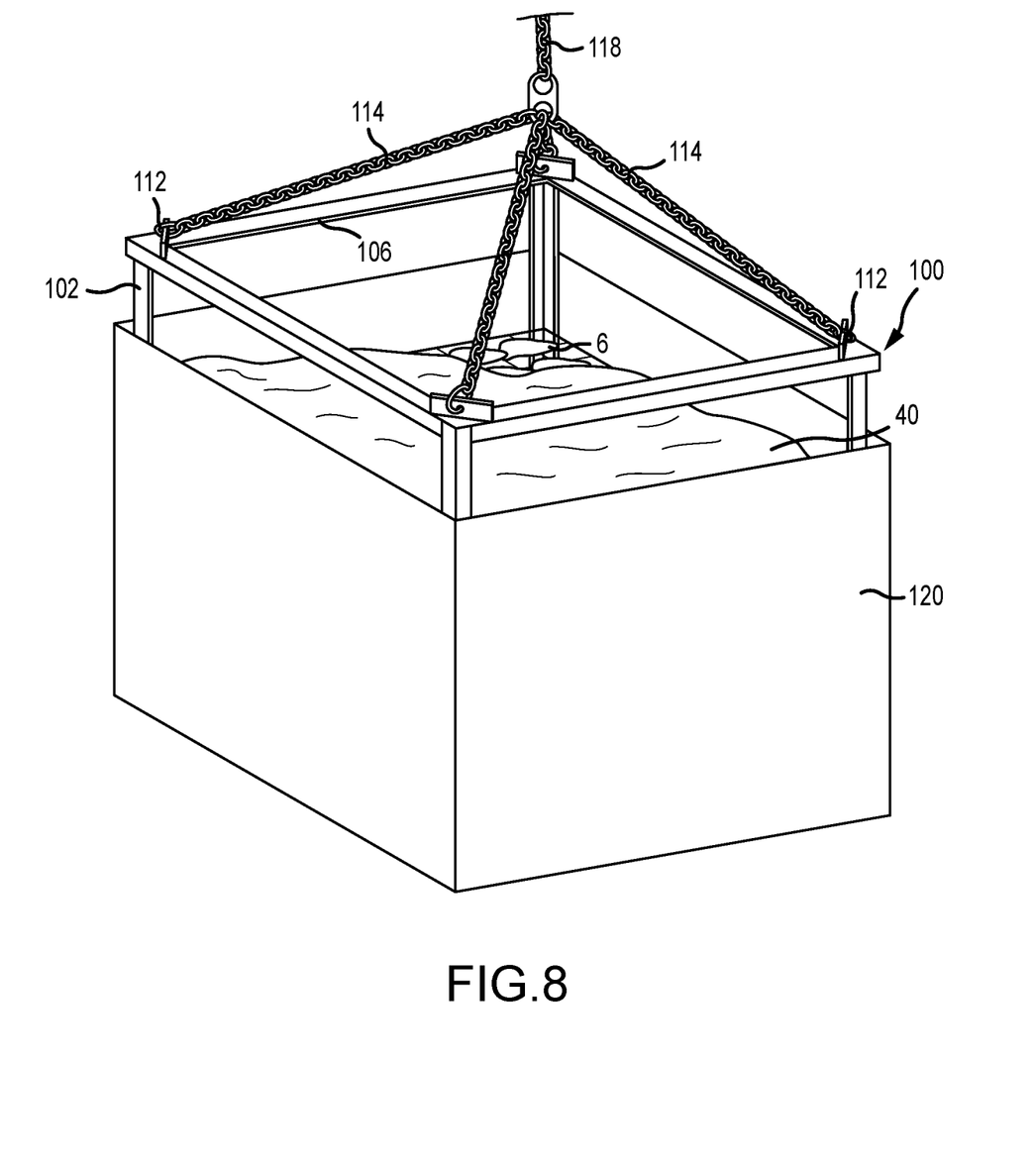
FIG. 8 is a perspective view of a lifting frame, soaking tank, and associated components according to one embodiment of the present disclosure.

FIG. 8 is a perspective view of the lifting frame 100 of FIG. 7 being provided into a tank 120. The tank 120 is shown as comprising the same or similar construction as that of FIGS. 3A-3B. As shown in FIG. 8, a lifting frame or magazine is provided that is operable to fit within the confines of a soaking tank 120, and wherein the internal dimensions of the soaking tank 120 are slightly larger than the external dimensions of the lifting frame 116. In various embodiments, a tolerance of between approximately 0.5 and 5.0 inches is provided between the lifting frame 116 and each side of the tank 120.

Although various embodiments of the present disclosure contemplate the provision of rectilinear lifting frame, racks, and tanks, it will be recognized that various other geometrical shapes are contemplated for features of the present disclosure. For example, in alternative embodiments, it is contemplated that at least one of a tank, a lifting frame, and a rack are provided with a circular shape. Such alternative shapes may be desirable for various reasons, including but not limited when racks and lifting frames of the present disclosure are to be provided in ovens, dehydrators or smokers of different shapes.

Various different embodiments are provided herein. It is contemplated that the various features of various different embodiments are contemplated for use with other embodiments of the disclosure, even if such a combination is not specifically shown or described herein. One of ordinary skill in the art would readily understand how to combine various inventive features of the present disclosure with other inventive features of the present disclosure.

While various embodiments of the disclosed device have been described in detail, it is apparent that modifications and alterations of those embodiments will occur to those skilled in the art. However, it is to be expressly understood that such modifications and alterations are within the scope and spirit of the present disclosure, as set forth in the following claims. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

The foregoing discussion has been presented for purposes of illustration and description. The foregoing is not intended to limit the disclosure to the form or forms disclosed herein. In the foregoing description for example, various features of the disclosure have been identified. It should be appreciated that these features may be combined together into a single embodiment or in various other combinations as appropriate. The dimensions of the component pieces may also vary, yet still be within the scope of the disclosure. Moreover, though the description has included description of one or more embodiments and certain variations and modifications, other variations and modifications are within the scope of the disclosure, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The present disclosure, in various embodiments, includes components, methods, processes, systems and/or apparatus substantially as depicted and described herein, including various embodiments, subcombinations, and subsets thereof. Those of skill in the art will understand how to make and use the devices of the disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation. Rather, as the following claims reflect, inventive aspects lie in less than all features of any single foregoing disclosed embodiment.

What is claimed is:

1. A method of producing jerky, the method comprising:
providing a meat product;
slicing the meat product into a plurality of meat segments;
providing the meat segments on a plurality of racks comprising screens or grates;
providing the plurality of racks in communication with a lifting frame and wherein the plurality of racks are provided in a vertically stacked arrangement;
wherein the vertically stacked arrangement is operable to provide a compressive force to at least some of the racks and the meat segments and prevent the meat segments from moving when immersed in a liquid marinade;
wherein the lifting frame comprises a plurality of vertical and horizontal supports and at least one lift point that is operable to receive a hook or lifting member;
providing a tank with an internal volume, and providing a liquid marinade within the internal volume;
at least one of lifting and translating the plurality of racks and the lifting frame with at least one of a hoist and a hook;
positioning the lifting frame and the plurality of racks within the internal volume of the tank such that each of the plurality of meat segments are in contact with the liquid marinade;
allowing the meat segments to rest in contact with the liquid marinade for a predetermined amount of time;
removing the lifting frame from the internal volume of the tank by vertically displacing the lifting frame; and
conveying the meat segments to at least one further processing step.

2. The method of claim 1, wherein the at least one further processing step comprises cooking the meat segments in an oven.

3. The method of claim 2, wherein each of the plurality of meat segments, the plurality of racks and the lifting frame are conveyed to the oven.

4. The method of claim 1, wherein the step of positioning the lifting frame and the plurality of racks comprises at least one of lifting and moving the lifting frame and the plurality of racks with the hoist, a motor and an elevated gantry.

5. The method of claim 1, wherein the plurality of racks comprise at least one of a mesh and a grate to allow for the liquid marinade to flow through the at least one rack.

6. The method of claim 1, wherein the predetermined amount of time comprises at least 4 hours.

7. The method of claim 1, wherein the step of providing a meat product comprises providing an at least partially-frozen meat product.

8. The method of claim 1, wherein the at least one further processing step comprises cooking the meat segments, allowing the meat segments to cool, and packaging the cooled meat segments.

9. The method of claim 1, wherein the lifting frame comprises four corners and a load or lift point is provided at each of the four corners.

10. The method of claim 9, wherein a tensile member is secured to each of the four corners prior to at least one of lifting and translating the plurality of racks and the lifting frame.

11. The method of claim 9, wherein the tank comprises a drain valve that is operable to selectively drain tank contents.

* * * * *